United States Patent [19]
Jacobson et al.

[11] Patent Number: 5,961,804
[45] Date of Patent: Oct. 5, 1999

[54] MICROENCAPSULATED ELECTROPHORETIC DISPLAY

[75] Inventors: Joseph Jacobson; Barrett Comiskey; Jonathan Albert, all of Cambridge, Mass.

[73] Assignee: Massachusetts Institute of Technology, Cambridge, Mass.

[21] Appl. No.: 08/819,320

[22] Filed: Mar. 18, 1997

[51] Int. Cl.$^6$ .................................................. B65D 19/00
[52] U.S. Cl. ........................... 204/606; 204/450; 359/296
[58] Field of Search ................................. 204/450, 606; 359/290, 296

[56] References Cited

U.S. PATENT DOCUMENTS

| | | | |
|---|---|---|---|
| 2,800,457 | 7/1957 | Green et al. | |
| 3,036,388 | 5/1962 | Tate . | |
| 3,406,363 | 10/1968 | Tate . | |
| 3,460,248 | 8/1969 | Tate . | |
| 3,585,381 | 6/1971 | Hodson et al. | 250/47 |
| 3,668,106 | 6/1972 | Ota | 204/299 |
| 3,792,308 | 2/1974 | Ota | 315/150 |
| 4,001,140 | 1/1977 | Foris et al. | 252/316 |
| 4,088,395 | 5/1978 | Giglia | 350/357 |
| 4,093,534 | 6/1978 | Carter et al. | 350/355 |
| 4,126,854 | 11/1978 | Sheridon | 340/373 |
| 4,143,103 | 3/1979 | Sheridon | 264/4 |
| 4,211,668 | 7/1980 | Tate | 252/316 |
| 4,231,641 | 11/1980 | Randin | 350/357 |
| 4,261,653 | 4/1981 | Goodrich | 350/362 |
| 4,273,672 | 6/1981 | Vassiliades | 252/316 |
| 4,298,448 | 11/1981 | Muller et al. | 204/299 R |
| 4,305,807 | 12/1981 | Somlyody | 204/299 R |
| 4,368,952 | 1/1983 | Murata et al. | 350/362 |
| 4,418,346 | 11/1983 | Batchelder | 340/787 |
| 4,419,383 | 12/1983 | Lee | 427/4 |
| 4,430,648 | 2/1984 | Togashi et al. | 350/332 |
| 4,438,160 | 3/1984 | Ishikawa et al. | 427/214 |
| 4,643,528 | 2/1987 | Bell, Jr. | 350/334 |
| 4,919,521 | 4/1990 | Tada et al. | 350/362 |
| 5,066,559 | 11/1991 | Elmasry et al. | 430/111 |
| 5,082,351 | 1/1992 | Fergason | 359/51 |
| 5,105,185 | 4/1992 | Nakanowatari et al. | 340/784 |
| 5,270,843 | 12/1993 | Wang | 359/52 |
| 5,380,362 | 1/1995 | Schubert | 106/493 |
| 5,389,945 | 2/1995 | Sheridon . | |
| 5,398,131 | 3/1995 | Hall et al. | 359/465 |
| 5,484,522 | 1/1996 | Entrekin | 210/86 |
| 5,508,068 | 4/1996 | Nakano | 428/1 |
| 5,565,885 | 10/1996 | Tamanoi | 345/100 |
| 5,582,700 | 12/1996 | Bryning et al. | 204/450 |

FOREIGN PATENT DOCUMENTS

| | | | |
|---|---|---|---|
| WO82/02961 | 9/1982 | European Pat. Off. | G02F 1/19 |
| WO97/04398 | 2/1997 | European Pat. Off. | G06F 15/02 |
| 60-189731 | 9/1985 | Japan | G02F 1/19 |
| 62-269124 | 11/1987 | Japan | G02F 1/19 |
| 62-299824 | 12/1987 | Japan | G02F 1/19 |
| 01086116 | 3/1989 | Japan | G02F 1/19 |
| 01267525 | 10/1989 | Japan | G02F 1/19 |
| 1465701 | 11/1973 | United Kingdom | G03G 9/12 |

*Primary Examiner*—David A. Redding
*Attorney, Agent, or Firm*—Cesari and McKenna, LLP

[57] ABSTRACT

An application-ready electrophoresis material includes a carrier and a dispersion of microcapsules therein, the microcapsules each containing a plurality of phases therein. At least some of the phases contrast visually and and exhibit differential responsiveness to an electric field, such that application of the field determines the visual appearance of the microcapsules. The material exhibits stability such the visual appearance persists despite removal of the field. In one aspect, the invention provides for enhanced stability of the visual appearance. In another aspect, the reflectivity of at least one of the phases is enhanced. In another aspect, one of the phases is particulate in nature and emits visible radiation.

45 Claims, 8 Drawing Sheets

MICROENCAPSULATED ELECTROPHORETIC DISPLAY

FIELD OF THE INVENTION

The present invention relates to electronic displays, and in particular to non-emissive displays.

BACKGROUND OF THE INVENTION

Nonemissive displays convey information using contrast differences, which are achieved by varying the reflectance of different frequencies of light; they are thus distinct from traditional emissive displays, which stimulate the eye by emitting light. One type of nonemissive display is an electrophoretic display, which utilizes the phenomenon of electrophoresis to achieve contrast. Electrophoresis refers to movement of charged particles in an applied electric field. When electrophoresis occurs in a liquid, the particles move with a velocity determined primarily by the viscous drag experienced by the particles, their charge (either permanent or induced), the dielectric properties of the liquid, and the magnitude of the applied field.

An electrophoretic display utilizes charged particles of one color suspended in a dielectric liquid medium of a different color (that is, light reflected by the particles) is absorbed by the liquid. The suspension is housed in a cell located between (or partly defined by) a pair of oppositely disposed electrodes, one of which is transparent. When the electrodes are operated to apply a DC or pulsed field across the medium, the particles migrate toward the electrode of opposite sign. The result is a visually observable color change. In particular, when a sufficient number of the particles reach the transparent electrode, their color dominates the display; if the particles are drawn to the other electrode, however, they are obscured by the color of the liquid medium, which dominates instead.

Ideally, the particles maintain a strong uniform charge throughout the lifetime of the device and move as rapidly as possible under the influence of a relatively small electric field. The switching time of suspended particles located between two electrodes is given by $$t = \frac{6\pi d^2 \eta}{V \varepsilon \zeta}$$

where d is the spacing between electrodes, $\eta$ is the viscosity of the liquid medium, $\varepsilon$ is its dielectric constant, V is the potential difference between the electrodes, and $\zeta$ is the zeta potential of the particles. The quantity t represents the time required for the population of particles to migrate from one of the electrodes to the other. Thus, the system is usually selected to minimize t. For example, the spacing between electrodes is as small as is necessary to ensure that the particles are completely obscured following migration away from the transparent electrode.

Useful electrophoretic displays are bistable: their state persists even after the activating electric field is removed. This is generally achieved via residual charge on the electrodes and van der Waals interactions between the particles and the walls of the electrophoretic cell. Unfortunately, the stability of current electrophoretic displays is limited. Although flocculation or settling of particles can be avoided by matching the density of the particles with that of the liquid medium, long-term particle agglomeration remains a problem. That is, cohesive forces among particles may eventually overcome dispersive forces, degrading the appearance and function of the display. For example, particle agglomerations cause visible patterning that detracts from the appearance of the display.

Another drawback of conventional electrophoretic displays is the frequent inability to adequately render a white tonality. For example, in a polychromatic electrophoretic display having ordinary red, green, and blue pigmented pixels, the combined output of such pixels will typically be gray because each is capable of reflecting only part of the incoming light; the additive combination of the reflected light will not provide a true white tonality.

DESCRIPTION OF THE INVENTION

Brief Summary of the Invention

In accordance with the present invention, electrophoretic displays are fabricated from discrete, microencapsulated electrophoretic elements, suitable examples of which are disclosed in U.S. application Ser. No. 08/738,260 and PCT application Ser. No. US96/13469, the entire disclosures of which are hereby incorporated by reference. Electrophoretic displays in accordance with the '260 application are based on microcapsules each having therein an electrophoretic composition of a dielectric fluid and a suspension of particles that visually contrast with the dielectric liquid and also exhibit surface charges. A pair of electrodes, at least one of which is visually transparent, covers opposite sides of a two-dimensional arrangement of such microcapsules. A potential difference between the two electrodes causes the particles to migrate toward one of the electrodes, thereby altering what is seen through the transparent electrode. When attracted to this electrode, the particles are visible and their color predominates; when they are attracted to the opposite electrode, however, the particles are obscured by the dielectric liquid.

In a first aspect, the invention comprises microencapsulated electrophoretic display with improved, controllable bistability and/or thresholding properties. In one embodiment, the microcapsules contain, in addition to one or more species of charged, colored microparticle, a liquid crystal material whose orientation is affected by the electric field used to translate the particles within the sphere. When the field is present, the liquid crystal material aligns with the field, permitting free translation of the microparticles; when the field is absent, the liquid crystal material loses alignment, impeding particle movement and thereby enhancing bistability and threshold.

In a second embodiment of this aspect of the invention, a charge opposite in polarity to that of the microparticles is conferred on the inside walls of the microcapsules. For example, appropriately signed charging agents may be copolymerized with or adsorbed onto the interior surfaces of the walls of the microcapsules.

In a second aspect, the invention comprises an electrophoretic display providing high optical clarity and the ability to render a white tonality. In this aspect, the electrophoretic particulate material is provided with a reflective component. In one embodiment, the electrophoretic particles are coated with a reflective material prior to their dispersion in the liquid carrier. In another embodiment, the reflective material is embedded within the particles. The embedded material may be, for example, a metallic flake or glass retroflector spheres. In a third embodiment, a conventional pigment particle is surrounded with an outer clear shell, which acts as a retroflector.

In a third aspect, the invention comprises a microencapsulated electrophoretic display suitable for operation in low-light environments. The display comprises particles that continuously emit visible light, or emit visible light in response to excitation radiation that is itself not visible. In either case, the liquid medium in which the particles are dispersed absorbs the emitted light, so that the light is only visible if the particles are gathered against the viewed surfaces of the microcapsules.

The electrophoretic systems of the present invention may be deposited by printing-that is, a non-vacuum deposition process capable of creating a pattern. Examples include screen printing, ink-jet printing, and contact processes such as lithographic and gravure printing. They can also be applied to substrates and constructions of arbitrary shape. Additionally, they can be manufactured into strings and threads suitable for weaving into textiles.

The displays of the present invention may include more than one type of particle. That is, the particles within each microcapsule may be heterogeneous in terms of physical properties and/or color. In this way it is, for example, possible to omit reliance on the carrier fluid for one of the display colors, using only differently colored particles.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Printable electrophoretic displays in accordance with the present invention comprise microcapsules each containing an internal phase (which may comprise surface-charged microparticles and a dielectric liquid), the particles and liquid contrasting visually. The microcapsules are typically dispersed in a binder, preferably one capable of being deposited using a printing process. Alternatively, the microcapsules may be dispersed in a carrier fluid for purposes of injection between glass or plastic plates as a replacement fluid for liquid crystal.

A wide range of pigment particles can serve as the internal-phase microparticles, the primary criteria governing their choice being appropriate charge, size, color, and amenability to processing as described below. The particles can range in size from 100 $\mu$m to less than 1 $\mu$m, but a preferred size range is 1–5 $\mu$m. The particles may exhibit a native charge, or be charged explicitly using a charge agent or charge-control agent (CCA), or may acquire a charge when suspended in the dielectric liquid. A CCA may be added to the pigment particles to confer a surface charge (zeta potential). The CCA may be capable of adsorbing directly onto the particle surfaces, or may be mixed in during fabrication of the particles. Generally, the CCA confers a zeta potential equal to 50–100 elementary charges on the surface of a particle 1 $\mu$m in radius; this produces a sufficient electrophoretic mobility on the order of $10^{-4}$ to $10^{-5}$ cm$^2$/V-sec. Suitable CCAs are well known in the art; they may be polymeric or non-polymeric in nature, and may also be ionic or non-ionic. Non-ionic polymeric CCAs include polyethylene, polybutene succinimide and various polyvinyl pyridine block copolymers. See, e.g., U.S. Pat. Nos. 5,380,362; 5,066,559; 4,680,103; and 4,298,448, the entire disclosures of which are hereby incorporated by reference. The CCA (and any underlying coating) should not interfere with the optical properties of the pigment particles.

Suitable microparticles may be manufactured by any of a variety of well-known techniques, including grinding, milling, nozzle atomization, rotary atomization, ultrasonic techniques, or the electrostatic combination of two atomized mists of polymer building blocks (e.g., hexamethylene diamine and adipoyl chloride, used to fabricate NYLON polymer), as well as other conventional approaches to production of fine powders.

FIG. 1 A shows an implementation of a concentric-nozzle atomization technique for manufacturing microparticles suitable for use herewith. A polymer that may or may not contain colorant or additional chemical agents is fed into the atomizing head 10 of the illustrated atomization apparatus. One suitable system is low-molecular-weight polyethylene with TiO$_2$, which produces white microspheres.

Figure 1A:
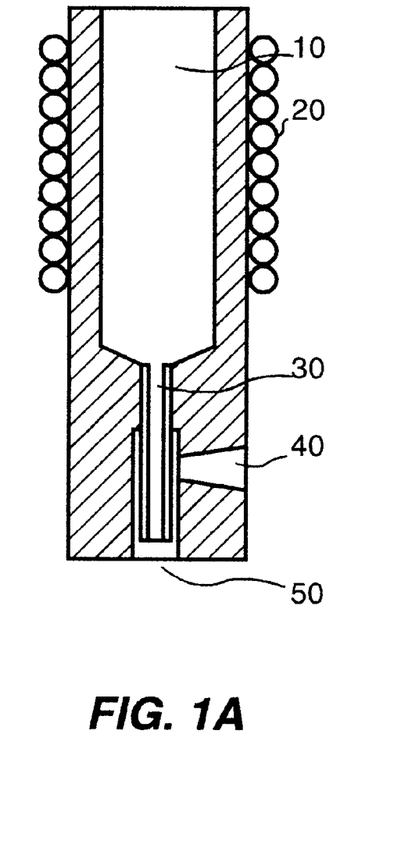
FIG. 1A is a schematic elevation of a concentric-nozzle atomization apparatus for manufacture of colorant microparticles.

A series of heater bands 20 surrounding the apparatus keeps the polymer in a liquid state such that it flows easily. A temperature of 170° C. was found sufficient to keep the just-mentioned polyethylene system molten.

The polymer is fed through a small tube 30 (which is fabricated from stainless steel or other suitable heat-resistant material) using a pressure head, or by means of a mechanical piston. Heated pressurized air is fed into the atomizing head 10 through an inlet 40. A pressure of 25 psi was found to be sufficient for producing a sphere size centered around 5 $\mu$m. The liquid polymer exits the end of tube 30 and flows into the concentric stream of hot, high-pressure air. In the mixing cavity 50, the two flows mix in a turbulent manner, causing the polymer to break up into small droplets that cool as they exit the apparatus and travel through ambient air. The particles can be removed from the air by any means known in the art of filtration (e.g., using filter materials, cyclone filtration, wet collection, or electrostatic precipitation).

The resulting particles are generally spherical and have a distribution of sizes. They can then be screened by size, e.g., on a shaken screen bed, or by any other means known in the art of solid classification. Particles that are not sufficiently small enough for use in the display material can be recycled.

A CCA can be associated with the microparticles in any number of ways. In one approach, the CCA material may be embedded in the polymer during formation of the internal-phase microparticles. For example, a system consisting of two sets of differentially colored microspheres may be prepared as follows. A first set of microspheres is formed by mixing a positive charging agent into molten polyethylene and $TiO_2$, and atomizing as described above. A second set of microspheres is formed by mixing a negative charging agent into molten polyethylene and atomizing. The resulting microparticles exhibit opposite electrical properties. Such charging agents (suitable examples of which are disclosed in the '103 patent) may diffuse slowly, over a period of years, into solution either naturally or as a result of an extremely long time-scale dissolution of the particle in the internal-phase carrier fluid. The result is a constant and oppositely poled source of charging.

A wide variety of other conventional CCAs, which are known to impart either a positive or negative charge to a particular species of polymer in a particular internal-phase carrier fluid, may also be employed. Alternatively, charging agents may be copolymerized into the internal-phase microparticles during their manufacture, or may be adsorbed onto the microparticles subsequent to manufacture. In still another alternative, it is possible to embed within the microparticles a species of radioactive material (such as an alpha-particle or beta-particle emitter) that causes ongoing charging.

Another approach to charging utilizes different plastics for different sets of internal-phase microparticles. For example, one can use polythylene for white microparticles and NYLON polymer for black microparticles. It is known that these plastics have opposite charging characteristics as a result of tribolelectric interactions. The use of different polymers along the triboelectric series produce different charging characteristics.

Additionally, triboelectric charging can be used to produce charged microparticles. Certain polymers can retain a charge over long periods of time (perhaps years) if the charge is applied to or acquired by the molten polymer, and the polymer is then solidified. The triboelectric series determines the magnitude and sign of the charge for the interaction between two different materials. If polyethylene is flowed through a glass tube, for example, it will acquire a negative charge and the glass tube will develop a positive charge. This principle can be employed to triboelectrically charge microparticles created via atomization or other processes. The charging element must be electrically isolated from ground to prevent dissipation of the charge.

To provide a reflective color display capable of producing a good white tone, a system of internal-phase microparticles different from standard pigments must be employed. As noted previously, the use of normal red, green, and blue pigmented particles will produce a combined output of gray because each is only able to reflect part of the incoming light. In order to produce a white shade, reflectivity is necessary.

Figure 1B:
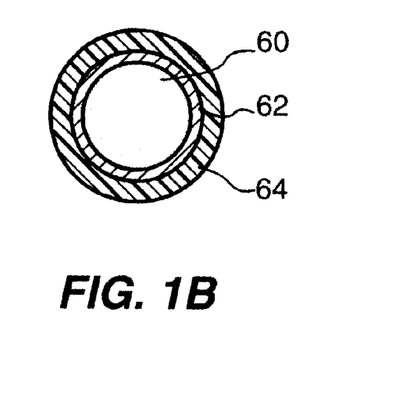
FIGS. 1B–1E are enlarged cross-sections of particles having enhanced reflectivities.

A reflective coating can be applied to a microparticle in accordance with techniques known to the art of metal-layer coating. For example, physical vapor deposition can be used to deposit a layer of aluminum, silver or gold on the microspheres, which can then be dyed red, green or blue. Such a sphere is depicted in FIG. 1B. The core sphere 60 is coated, by vacuum deposition, first with a metal layer 62, which is then dyed. The particle is subsequently coated with a charge-retaining layer 64.

Figure 1C:
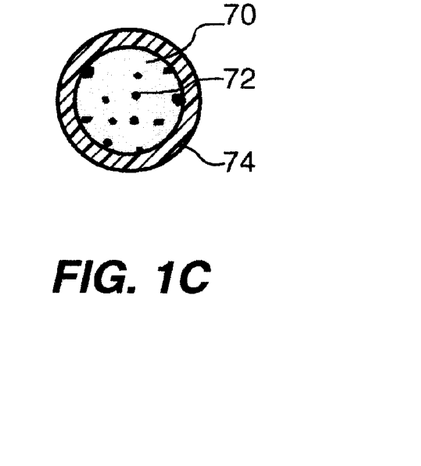

In another approach, the microspheres have a reflective material embedded in the polymer used to form the spheres. Aluminum film flake can be used for this purpose, as shown in FIG. 1C. The polymer sphere 70 has aluminum flake 72 embedded inside the polymer matrix. These may be introduced, for example, by simple mixing into the bulk fluid before it is atomized. Color layer 74, applied to the surface of sphere 70, provides one of the tints necessary for a color display; generally three tints are used for a full-color additive display. Suitable dyes and their methods of application (doping, coating, etc.) are well characterized in the art of pigment production.

Figure 1D:
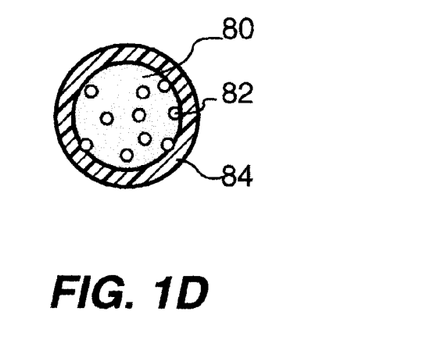

Alternatively or in addition, microscopic glass retroreflector spheres can be embedded in the polymer microsphere to achieve reflectivity as shown in FIG. 1D. The polymer sphere 80 contains a dispersion of glass spheres 82, which may be colored. Glass spheres 82 may be also be introduced into a bulk fluid prior to atomization. Color layer 84 provides one of the three tints necessary for a color display.

Figure 1E:
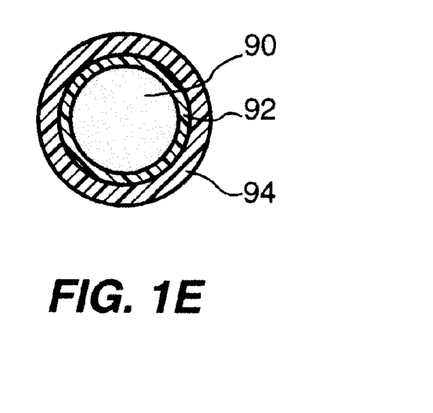

A final technique for making a reflective microsphere is to surround a colored microparticle with an outer clear coating. This outer sphere then acts as a retroreflector as shown in FIG. 1E. In this case, the polymer microparticle 90 receives a colorant 92 (e.g., by doping), and is then further encapsulated in another material such as a transparent plastic (e.g., polyethylene) 94 to provide a reflective lens effect. Encapsulation may be effected by co-atomizing the polymer microparticles in a molten jet of polyethylene.

As an alternative to reflection, microparticles can be fabricated to actually emit visible light, rendering them suitable for low-light conditions. Suitable microparticles are doped with electroluminescent material, fluorescent material, phosphorescent material (such as a radium- or tritium-doped phosphor) or other light-generating compound or complex.

The internal phase generally comprises a carrier fluid and microparticles. The carrier fluid should have good electrophoretic characteristics (high electrical resistivity, acting as a good solvent for the dye that colors the fluid but a poor solvent for the microparticles) as well as other relevant characteristics (low toxicity, high boiling point, etc.) In another embodiment of the present invention, the carrier fluid is not colored (i.e., a dye is not present in the system); instead differential, switchable color is provided by multiple species of differently colored microparticles present in the suspension.

The specific gravity of the suspension should generally match the microparticles that are dispersed therein. In another embodiment of the present invention, additional system modifiers, for example liquid-crystal molecules, are incorporated into the suspension to modify the bistability and/or threshold characteristics of the display. One skilled in the art can readily select an electrophoretic carrier liquid for use in the present invention, possibly with certain limitations imposed by the selected microencapsulation process (for example, high boiling point).

Encapsulation of the internal phase may be accomplished in a number of different ways. Numerous suitable procedures for microencapsulation are detailed in both Kondo, *Microcapsule Processing and Technology* and Gutcho, *Microencapsulation*. The processes fall into several general categories, all of which can be applied to the present invention: interfacial polymerization, in-situ polymerization, physical processes, in-liquid curing, and simple/complex coacervation.

In the context of the present invention, one skilled in the art will select a microencapsulation procedure and wall material based on the desired microcapsule properties. These properties include the distribution of microcapsule radii; electrical, mechanical, diffusion, and optical properties of the microcapsule wall; and chemical compatibility with the internal phase of the microcapsule.

The microcapsule wall generally has a high electrical resistivity; although it is possible to use walls with relatively low resistivities, this may limit performance in requiring relatively higher addressing voltages. A full discussion of the relevant electrical properties of the microcapsule wall is set forth in U.S. Pat. No. 4,605,284, the entire disclosure of which is hereby incorporated by reference. The microcapsule wall should also be mechanically strong (although if the finished microcapsule powder is to be dispersed in a curable polymeric binder for coating, mechanical strength is not as critical). The microcapsule wall generally should not be porous. If, however, it is desired to use a microencapsulation procedure that produces porous microcapsules, these can be overcoated in a post-processing step (i.e., a second microencapsulation). Moreover, if the microcapsules are to be dispersed in a curable binder, the binder will serve to close the pores. The microcapsule walls should be optically clear; the wall material may, however, be chosen to match the refractive index of the internal phase of the microcapsule (the electrophoretic suspension) or a polymeric binder in which the microcapsules are to be dispersed. For some applications (e.g., interposition between two fixed electrodes), monodispersed microcapsule radii are desirable. More typically, however, a distribution of radii actually produces higher contrast since the viewing plane is more densely filled with the display medium.

A microencapsulation technique that is highly suited to the present invention is set forth in U.S. Pat. No. 4,087,376, the entire disclosure of which is hereby incorporated by reference. The procedure involves a polymerization between urea and formaldehyde in an aqueous phase of an oil/water emulsion in the presence of a negatively charged, carboxyl-substituted, linear aliphatic hydrocarbon polyelectrolyte material. The resulting microcapsule wall is a urea/formaldehyde copolymer, which discretely encloses the internal phase. The capsule is clear, mechanically strong, and has good resistivity properties.

The related technique of in-situ polymerization utilizes an oil/water emulsion, which is formed by dispersing the electrophoretic composition (i.e., the dielectric liquid containing a suspension of the pigment particles) in an aqueous environment. The monomers polymerize to form a polymer with higher affinity for the internal phase than for the aqueous phase, thus condensing around the emulsified oily droplets as a skin. In one especially useful in-situ polymerization processes, urea and formaldehyde condense in the presence of poly(acrylic acid); see U.S. Pat. No. 4,001,140. In other useful process, described in U.S. Pat. No. 4,273,672, any of a variety of cross-linking agents borne in aqueous solution is deposited around microscopic oil droplets. Such cross-linking agents include formaldehyde, glyoxal, glutaraldehyde and other formaldehyde donors, trioxane, ethanolamine, ethylenediamine, boric acid, borates such as sodium borate, or macromolecular species such as gelatin, gum tragacanth, methylcellulose and A-stage formaldehyde condensation products. The entire disclosures of the '140 and '672 patents are hereby incorporated by reference.

The coacervation approach also utilizes an oil/water emulsion. In this case, however, the monomers that will form the microcapsule shell are present in the dispersed-phase droplets rather than in the aqueous phase. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457 (the entire disclosure of which is hereby incorporated by reference).

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Figure 2A:
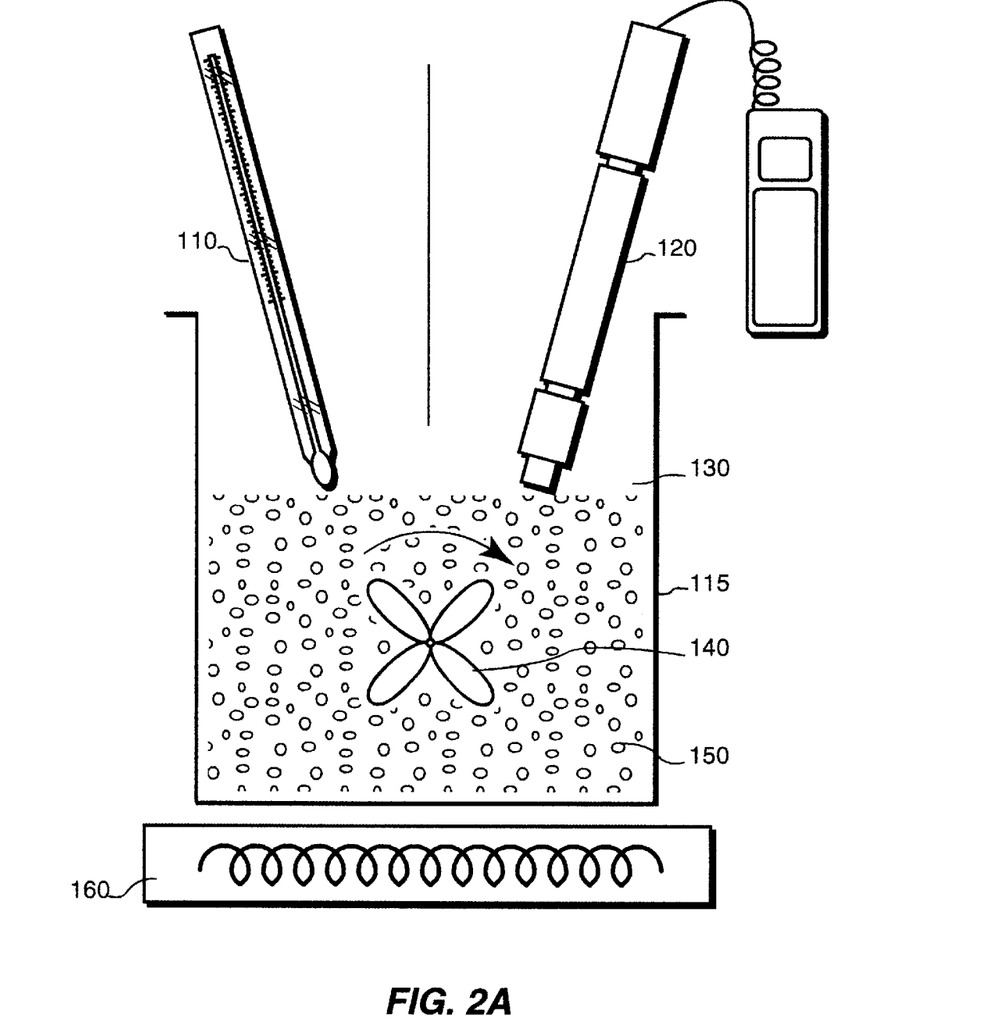
FIG. 2A schematically illustrates an exemplary apparatus and environment for performing emulsion-based microencapsulation.

FIG. 2A illustrates an exemplary apparatus and environment for performing emulsion-based microencapsulation. An oil/water emulsion is prepared in a vessel 115 equipped with a device 110 for monitoring and a device 160 for controlling the temperature; a pH monitor 120 may also be included. An impeller 140 maintains agitation throughout the microencapsulation process, and in combination with emulsifiers, can be used to control the size of the emulsion droplets 150 that will lead to the finished microcapsules. The aqueous continous phase 130 may contain, for example, a prepolymer and various system modifiers.

Figure 2B:
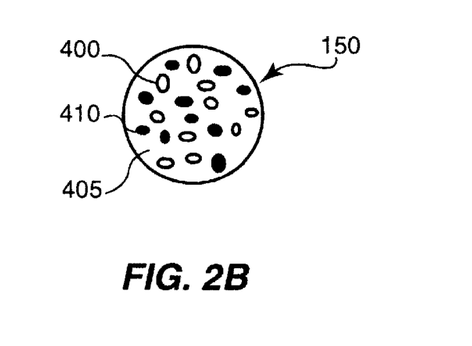
FIG. 2B illustrates an oil drop comprising a substantially transparent carrier liquid, and black and white particles dispersed therein.

FIG. 2B illustrates an oil drop 150 comprising a substantially transparent electrophoretic suspending fluid 405, in which is dispersed white microparticles 400 and black microparticles 410. Preferably, microparticles 400, 410 have specific gravities substantially similar or equal to one another and to suspending fluid 405. The liquid phase may also contain some threshold/bistability modifiers, CCAs, and/or hydrophobic monomers to effect an interfacial polymerization.

Figure 2C:
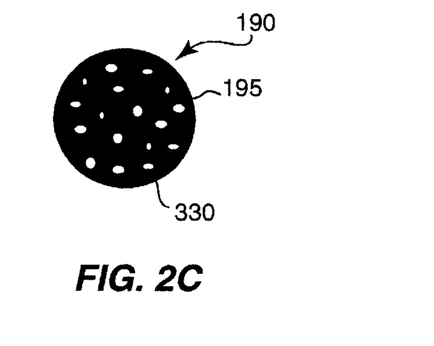
FIG. 2C illustrates an oil drop comprising a colored carrier liquid and a dispersion of white microparticles therein.

FIG. 2C illustrates a similar oil drop 190 comprising a darkly dyed electrophoretic suspending fluid 195 containing a dispersion of white microparticles 330 and appropriate CCAs.

Figure 3A:
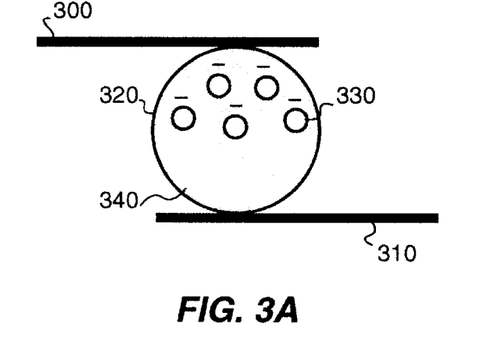
FIGS. 3A–3F are enlarged cross-sections of microcapsules containing microparticles of a single type of color, or no particles at all.

FIGS. 3A–3F show a variety of electrophoretic microcapsules containing a microparticles of a single type or color, or no microparticles at all. In FIG. 3A, a transparent electrode 300 and a rear electrode 310 may be selectively and oppositely biased such that a quantity of charged, colored microparticles 330 contained within the microcapsule 320 translate either toward or away from one of the electrodes through the dyed carrier fluid 340. In one such configuration, microparticles 330 are drawn toward transparent electrode 300, rendering them visible. In the opposite configuration, microparticles 330 are drawn toward rear electrode 310, causing them to be obscured by dyed fluid 340.

Figure 3B:
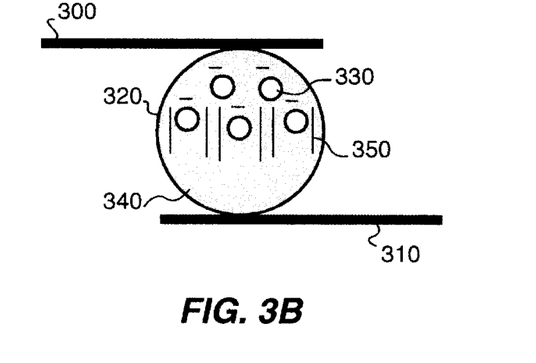
Figure 3C:
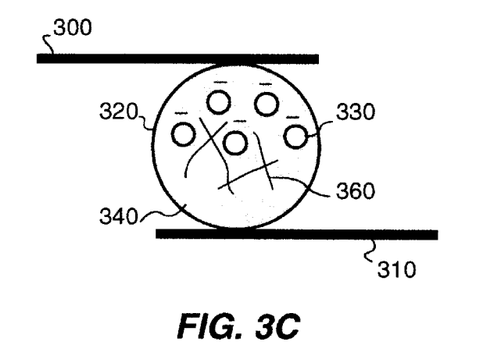
Figure 3D:
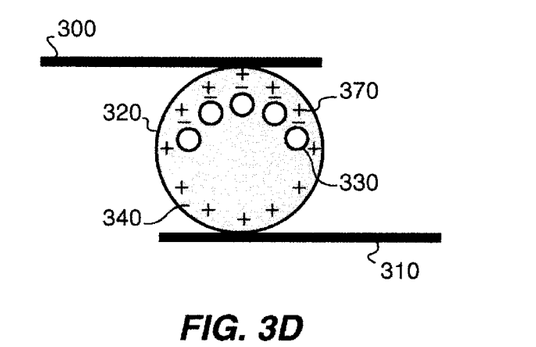

Although the system shown in FIG. 3A may be bistable and may exhibit a threshold (i.e., resistance to substantial particle migration below a minimum potential) due to surface interactions between microparticles 330 and cell wall 320, the systems shown in FIGS. 3B–3D represent systems that facilitate more direct control over the characteristics of the bistability and/or threshold. In FIGS. 3B and 3C, the microcapsule 320 also contains a liquid crystal material shown at 350, 360. In the presence of an electric field (FIG. 3B), liquid crystal material 350 aligns with the field, allowing microparticles 330 to translate between electrodes 300, 310. In the absence of the applied field, as shown in FIG. 3C, the liquid crystal material assumes the substantially unaligned state indicated at 360, which hinders the migration of microparticles 330 between electrodes 300, 310. Liquid crystal molecules useful for this purpose are conventional in the art, suitable examples of which are disclosed in U.S. Pat. No. 4,305,807, the entire disclosure of which is hereby incorporated by reference.

In FIG. 3D, charging agents 370 are either copolymerized with, or adsorbed or chemically bound to, the interior surface of the wall of microcapsule 320. Such charging agents 370 have charges of polarity opposite those of the microparticles 330, and interact with the oppositely charged microparticles to effect a bistability and/or threshold; that is, the bound charges add a further retentive force discouraging stray, uninduced microparticle migration. The degree of interaction between microparticles 370 and the wall of microsphere 320 determines the contributive effect on bistability, and also the effect on the potential difference needed to cause complete microparticle migration within the desired switching time (that is, the threshold). Suitable charging agents are conventional in the art of electrophoretic displays. Alternatively, the charges may arise from the nature of the polymeric wall of microcapsule, either through copolymerization of charged or highly polar groups, or through triboelectric interactions between polymers of different type (that is, between the polymer of the particles and the polymer of the microcapsule walls).

Figure 3E:
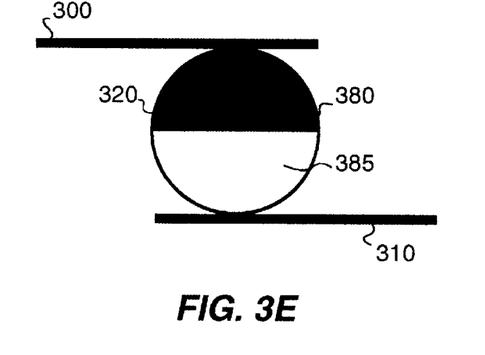

FIG. 3E shows a microencapsulated electrophoretic system that does not utilize particles. Instead, the internal phase of microcapsule 320 consists of two differently colored, immiscible liquids 380, 385 that have different electrical properties such that they may be differentially addressed through selective biasing of electrodes 300, 310. For example, as disclosed in U.S. Pat. No. 5,582,700, (the entire disclosure of which is hereby incorporated by reference), liquids 380, 385 may be an emulsion of a nonpolar continuous phase and a polar noncontinuous phase. The polar phase of the emulsion is capable of forming droplets (reverse micelles or reverse emulsions) in the non-polar phase, and includes a dye that is insoluble in the nonpolar phase. The dye-containing droplets can be transported within the nonpolar phase using an electric field. By using the field to control the distribution of the polar droplets, it is possible to manipulate the polar phase to separate it from the nonpolar phase, or to coagulate or disperse it within the nonpolar phase. The emulsion has the combined color appearance of the nonpolar and polar phases when the polar phase is dispersed. By causing the polar phase to agglomerate, however, it is possible to alter the visible color to that of the polar phase by attracting and coagulated this phase near one of the electrodes 300, 310.

Figure 3F:
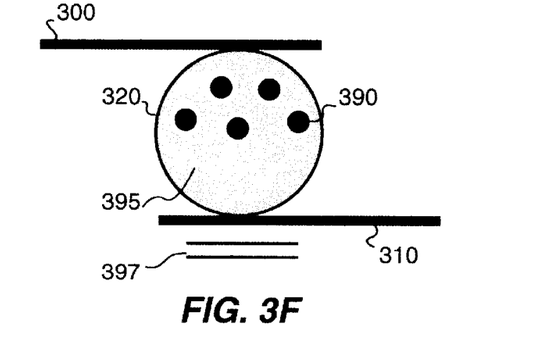

FIG. 3F illustrates a backlit system suitable for low-light applications. In this case, the microparticles 390 contain a fluorescent, phosphorescent or other light-emitting material (which may be integral or surface-adsorbed); suitable materials include, for example, radium- or tritium-doped phosphors, or an electroluminescent system. A suspending fluid 395 contains a dye that blocks visible light. Thus, if light-emitting microparticles are drawn toward rear electrode 310, they will be obscured-that is, their visible-light signal will be absorbed-by liquid 395. Alternatively, suspending fluid 395 may block visible light but pass ultraviolet (UV) or other excitation radiation emitted by a source or backlight 397 disposed behind electrode 310 (which is likewise transparent to the excitation radiation). Radiation from source 397 causes microparticles 390 to fluoresce; the microparticles will be visible when attracted to electrode 300, but obscured when attracted to electrode 310. See, e.g., U.S. Pat. No. 3,792,308, the entire disclosure of which is hereby incorporated by reference.

Figure 4A:
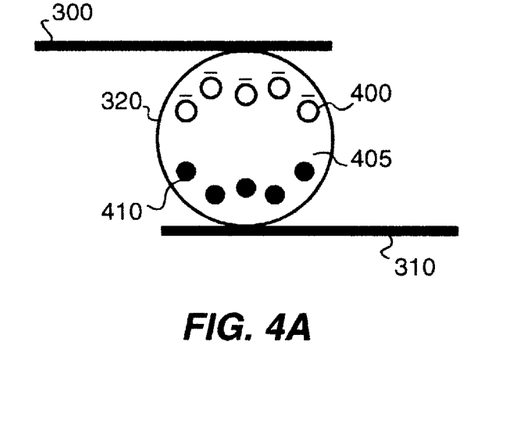
FIGS. 4A–4E are enlarged cross-sections of microcapsules containing microparticles of multiple types or colors.
Figure 4B:
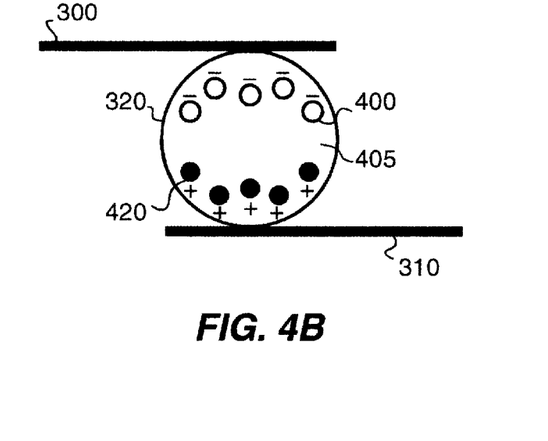

FIGS. 4A–4E show a variety of electrophoretic microcapsules containing microparticles of multiple types or colors. With reference to FIG. 4A, electrophoretic microcapsule 320 contains a carrier fluid 405 in which are dispersed a quantity of charged microparticles 400 of one color and a similar quantity of uncharged microparticles 410 of a different or visually contrasting color. Transparent electrode 300 and rear electrode 310 may be biased such that charged, colored microparticles 400 are translated either toward electrode 300, in which case their color predominates; or toward electrode 310, in which case the color of microparticles 410 predominates (since microparticles 400 are hidden beneath microparticles 410). Alternatively, as illustrated in FIG. 4B, microparticles 400 and differently colored microparticles 420 can carry opposite charges, creating push-pull effect that enhances the visibility of microparticles attracted to electrode 300 and reduces visual interference from the other microparticles. As another alternative, the different sets of particles can have the same charge sign but different charge magnitudes.

Figure 4C:
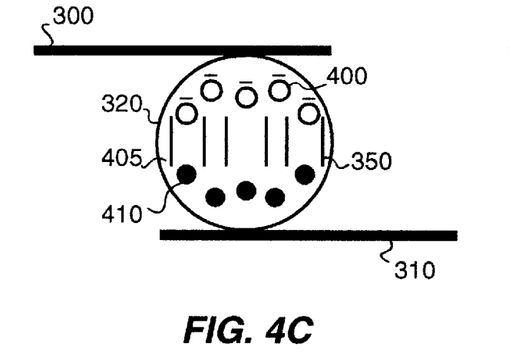
Figure 4D:
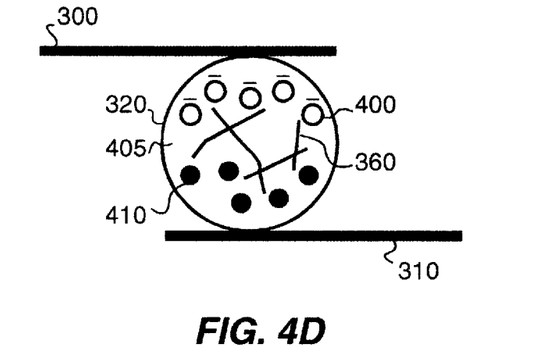

As in FIGS. 3B–3D, FIGS. 4C–4E illustrate systems that facilitate direct control over the characteristics of the bistability and/or threshold. In FIGS. 4C and 4D, microcapsule 320 contains a quantity of charged microparticles 400 and a quantity of uncharged microparticles 410, and a liquid crystal material shown at 350, 360. In the presence of an electric field (FIG. 4C) liquid crystal material 350 aligns with the field, allowing microparticles 400, 410 to translate between electrodes 300, 310. In the absence of the applied field (FIG. 4D), the liquid crystal material assumes the substantially unaligned state indicated at 360, which hinders migration of microparticles 400, 410 between electrodes 300, 310. Again, it is possible for both types of particles 400, 410 to carry opposite charges, creating push-pull effect that enhances the visibility of microparticles attracted to electrode 300 and reduces visual interference from the other microparticles.

Figure 4E:
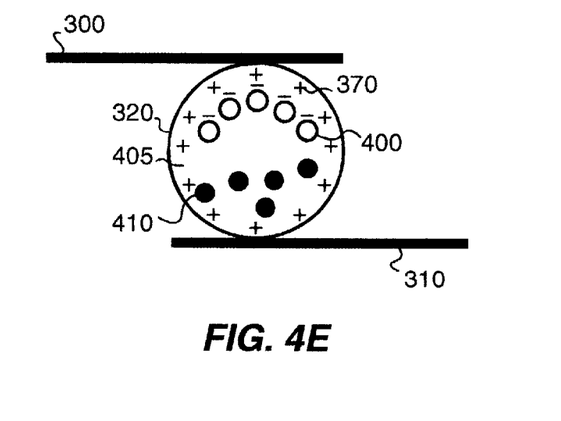

In FIG. 4E, CCAs 370 are either copolymerized with or adsorbed onto the interior surface of the wall of microcapsule 320. Such CCAs 370 have charges of polarity opposite that of the charged microparticles 400, and interact with the oppositely charged microparticles to effect a desired bistability and/or threshold.

Figure 5A:
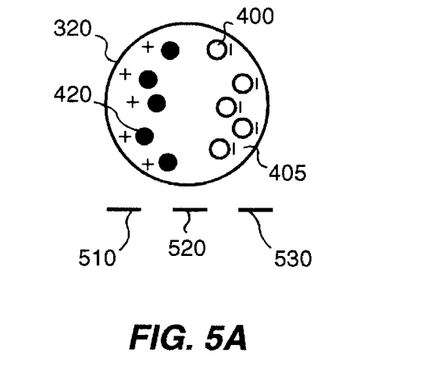
FIGS. 5A–5D are schematic, sectional depictions of rear-addressed electrophoretic display systems.

FIGS. 5A–5D illustrate systems that do not require a top transparent electrode 300, and are therefore termed "rear-addressed" systems. In FIG. 5A, three electrodes 510, 520, 530 lie in a substantially coplanar orientation with respect to a microcapsule 320, or may be closely spaced to one another around the exterior surface of the microcapsule. A potential applied to one of the electrodes will induce an opposite charge in the other electrodes, so long as the other electrodes are effectively connected to the ground return of the driven electrode. Microcapsule 320 contains quantities of oppositely charged and differently colored microparticles 400, 420. If electrode 510 is biased negatively, electrodes 520, 530 are correspondingly biased positively relative to electrode 510; accordingly, microparticles 400, 420 will be oriented in the manner illustrated. By successively biasing electrode 520 and then electrode 530 negatively, microparticles 420 will be drawn across the bottom of microcapsule 320, adjacent the plane of the electrodes, forcing microcapsules 400 toward the upper region of the microcapsule; effectively, the microparticles 420 are commutated along the path defined by electrodes 510–530. A similar procedure with positive instead of negative bias will cause the opposite color orientation. Obviously, owing to the need for separate sets of electrodes for each container 320, this system is best suited for large electrophoretic capsules.

Figure 5B:
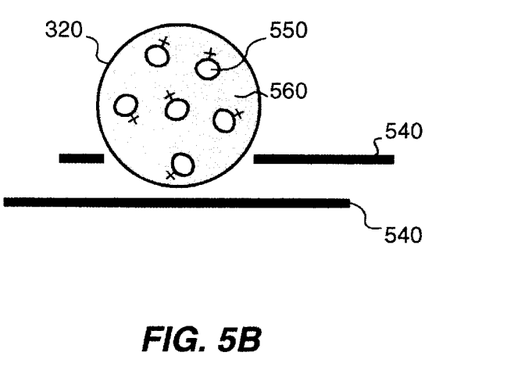

As shown in FIG. 5B and discussed in the '469 PCT application, a microcapsule 320 may contain a continuous phase 560 having a frequency-independent dielectric constant and exhibiting a first color. Dispersed in liquid 560 is a material 550 having a dielectric constant that does depend on frequency and exhibits a second color; for example, material 550 may have a higher dielectric constant than phase 560 at low frequency, and a smaller dielectric constant than phase 560 at higher frequency. Application of a low-frequency AC field by means of electrodes 540 causes material 550 to be more attracted than phase 560 to the high-field region proximal to the electrodes, so microcapsule 320, when viewed from above, exhibits the color of phase 560. Conversely, application of a high-frequency AC field by means of electrodes 540 causes phase 560 to be more attracted to the high-field region than material 550, so microcapsule 320, when viewed from above, exhibits the color of material 550. Such a configuration represents a dielectrophoretic system.

Figure 5C:
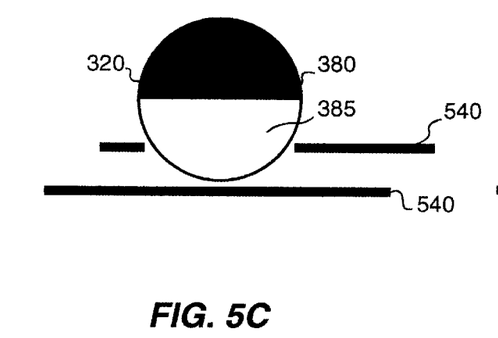

As shown in FIG. 5C, both phases may be liquid in nature. At a first frequency, the liquid 380 has a higher dielectric constant than the differently colored liquid 385; at a second frequency, liquid 380 has a lower dielectric constant than liquid 385. At the first frequency, therefore, liquid 380 is attracted to the region proximal to electrodes 540, and the microcapsule 320, viewed from above, takes on the color of liquid 385. At the second frequency, the opposite effect obtains, and the microcapsule appears as indicated in FIG. 5C.

Figure 5D:
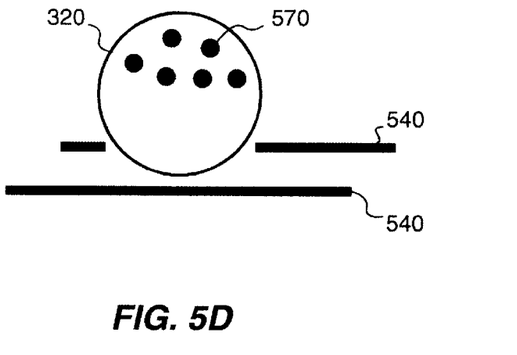

In another alternative, illustrated in FIG. 5D, a quantity of microparticles 570 are composed of varistor or semiconductor material, and exhibit a conductance that varies with voltage. The microparticles 570 and the surrounding fluid are differently colored. If microparticles 570 were always conductive, they would be electrostatically drawn toward the divergent electric field generated by electrodes 540 (the rate of movement being determined by the strength of the field). However, because the conductivity microparticles 570 also depends on the field strength, they will not experience significant force at low voltages; in other words, their rate of movement is twofold dependent on field strength. Accordingly, if microparticles 570 are initially dispersed, the color of microcapsule 320 will reflect the contribution of both the microparticles 570 and the surrounding fluid. At low voltages, this appearance will not quickly be affected. At high voltages, however, microparticles 570 become conductive, and are therefore drawn rapidly toward electrodes 540; the appearance of microcapsule 320, viewed from above, will be determined by the electrophoretic fluid (which obscures microparticles 570).

A similar effect can arise from frequency dependence. Because they are semiconductors, microparticles 570 do not polarize instantly, even when subjected to high voltages. Therefore, if a high-frequency AC current is applied to electrodes 540, microparticles 570 will not polarize substantially, and therefore will experience little attraction toward electrodes 540. At lower frequencies, the microparticles will be able to polarize in response to the changing field, and the microparticles 570 will therefore be drawn toward electrodes 540. Naturally, higher-amplitude AC signals will draw the polarizing microparticles more rapidly.

Figure 6A:
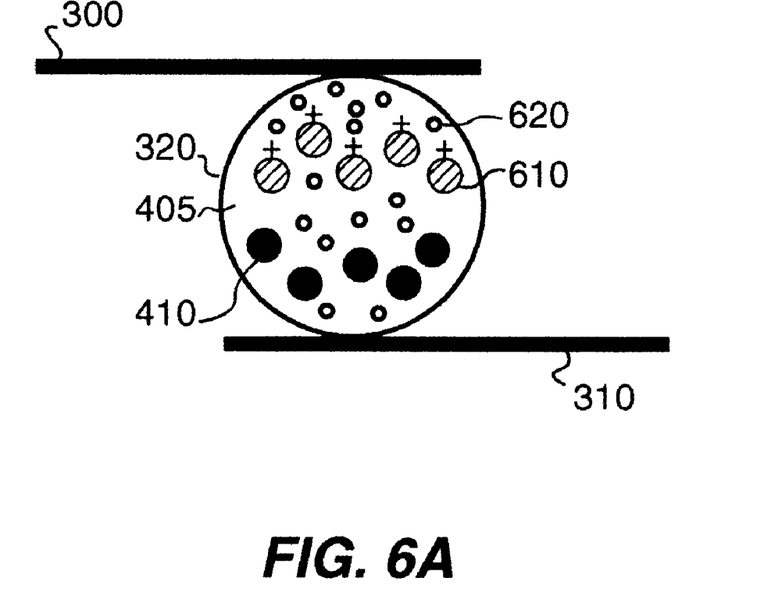
FIGS. 6A and 6B are enlarged cross-sections of microcapsules containing particles of more than one color, and reflective agents.
Figure 6B:
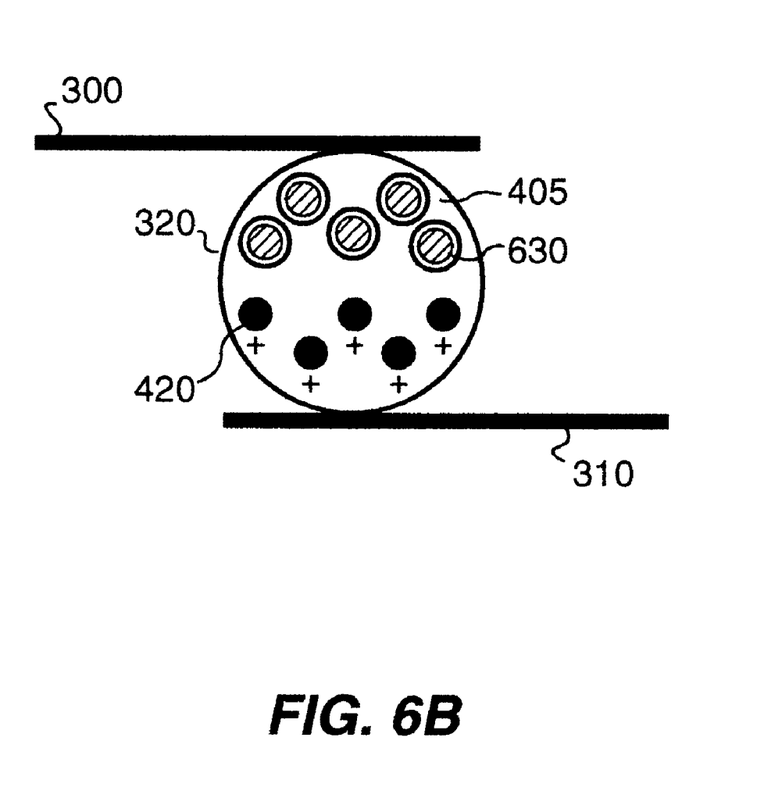

FIGS. 6A and 6B illustrate the manner in which the reflectivity concepts discussed earlier can be applied to full-color displays. In a full-color reflective display, the individual colored states red, green, and blue desirably have reflectivities corresponding to at least three times the normal reflectivity of printed red, green and blue, so that when added their sum is a paper white. In FIG. 6A, a quantity of retroreflective glass or density-matched plastic spheres 620 (similar to those used in retroreflecting signs) are dispersed within microcapsule 320, thus producing a brighter pixel. Preferably, the refractive index of spheres 620 is substantially larger than that of the surrounding fluid 405, so that spheres 620 act as lenses.

Alternatively, as shown in FIG. 6B, a highly reflective colored microparticle 630 may be formed by overcoating a reflecting microparticle with a transparent colorant, or by encapsulating an opaque colorant in a clear shell (which acts as a retroreflecting lens).

Figure 7A:
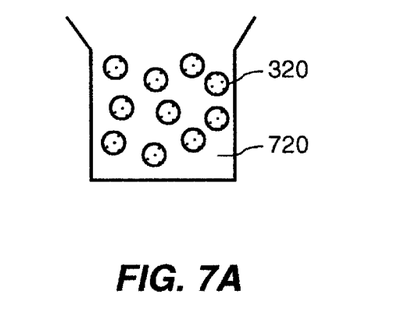
FIG. 7A schematically depicts a printable ink comprising a suspension of microencapsulated electrophoretic displays in accordance with the invention.
Figure 7B:
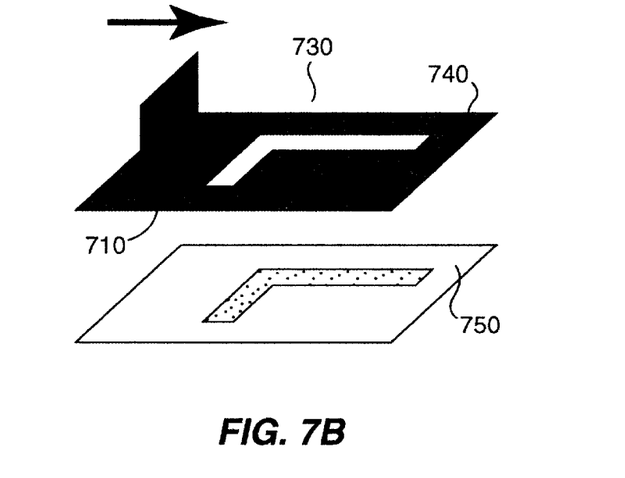
FIG. 7B illustrates a screen-printing arrangement for the ink shown in FIG. 7A.

FIGS. 7A–7E illustrate the use of microcapsule displays to form a printing ink. Thus, as shown in FIG. 7A, a printable electronic ink 710 is produced by dispersing microcapsule systems 320 in a carrier 720 suitable for printing to form a slurry or dispersion. The carrier may be photohardenable (e.g., a UV-curable polymer), or may be thermally or chemically curable. Alternatively, the carrier may be evaporatively setting (e.g., a water-based polymer as is commonly employed in the printing industry), or may be non-curable. For example, a non-curable system may be used as a replacement fluid for liquid crystal displays; in such applications, the microcapsule dispersion is vacuum injected between the two (normally glass) display electrodes. As shown in FIG. 7B, ink 710 may be printed by conventional means such as stencil printing, in which ink 710 is pushed through a stencil 740 to form an image.

Figure 7C:
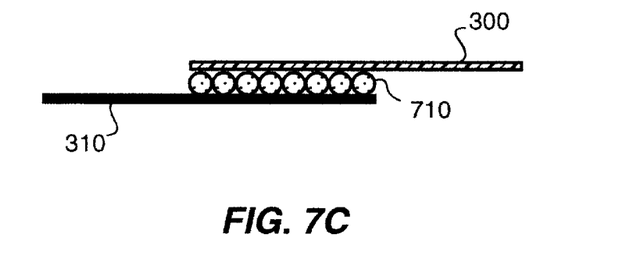
FIGS. 7C–7E illustrate printing of the ink shown in FIG. 7B onto arbitrary surfaces or within boundaries.
Figure 7D:
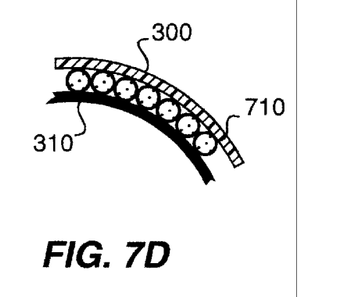
Figure 7E:
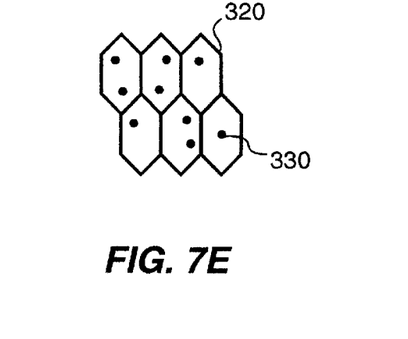

Alternatively, ink 710 may be printed onto arbitrary surfaces to form an electronically addressable display on a flat surface or curved surface, as shown in FIGS. 7C and 7D. Furthermore, the walls of microcapsules 320 may be either weakened chemically or subjected to pressure to fit precisely within linear boundaries, as shown in FIG. 7E. This increases the aperture ratio (i.e., the percentage of the viewing surfaced actually occupied by contrast material) by reducing the gaps between microspheres.

Figure 8A:
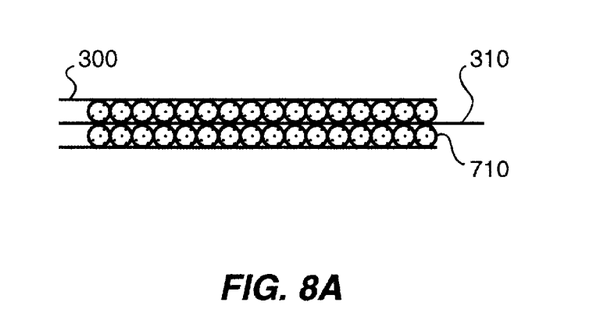
FIGS. 8A and 8B are enlarged cross-sections illustrating manufacture of threads or strings comprising electrophoretic displays in accordance with the invention.
Figure 8B:
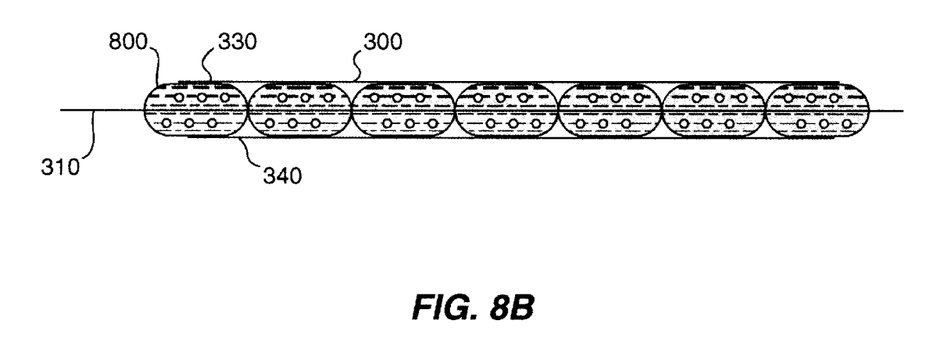

FIGS. 8A and 8B show how filaments, threads or strings may be formed from microcapsules in accordance with the invention. As shown in FIG. 8A, a thread or string is formed from a thin, flexible, transparent tube electrode 300, which is filled with ink 710. A wire electrode 300 is drawn through tube 300 (without contacting the walls) and the ends of tube 300 sealed, thereby completing the device.

Alternatively, as shown in FIG. 8B, an encapsulted electrophoretic thread may be formed without the use of microcapsules, by starting with a clear tube material 800. Tube 800, which is transparent and typically polymeric in nature, is filled with the internal phase of an electrophoretic system comprising, for example, a dispersion of colored microparticles 330 and in a dyed carrier fluid 340. A thin wire electrode 340 is drawn through tube 800, and the tube is crimped thermally or chmeically to create a series of capsules each containing the electrophoretic dispersion and a length of electrode 310. A transparent electrode 300 is then applied to the exterior of crimped tube 800, forming the thread. Applying a voltage between electrode 300 and 310 causes the thread to change color.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An electrophoretic or dielectrophoretic material comprising a carrier and a dispersion of microcapsules therein, the microcapsules each comprising:
   a. a plurality of particles at least some of the particles having an electrophoretic mobility;
   b. means for enhancing the reflectivity of at least some of the particles; and
   c. a dyed fluid.

2. The material of claim 1 wherein the means for enhancing reflectivity of at least some of the particles comprises a reflective material associated with the at least some of the particles.

3. The material of claim 2 wherein the reflective material is a metal shell coated over the particles.

4. The material of claim 3 wherein the reflective coating is a metal shell.

5. The material of claim 4 wherein the metal is selected from the group consisting of aluminum, silver and gold.

6. The material of claim 2 wherein the reflective material comprises metal flakes embedded within the particles.

7. The material of claim 2 wherein the reflective material is a quantity of glass retroreflector spheres embedded within the particles.

8. The material of claim 2 wherein the reflective material is an outer clear capsule surrounding each particle.

9. The material of claim 1 wherein the means for enhancing reflectivity comprises a reflective material dispersed in the liquid phase.

10. The material of claim 9 wherein the reflective material comprises clear particles.

11. The material of claim 10 wherein the liquid phase and the clear particles have refractive indices, the refractive index of the particles exceeding that of the liquid phase.

12. The material of claim 2 wherein at least some of the particles have a first optical property and the dyed fluid has a second optical property.

13. An electrophoretic or dielectrophoretic material comprising a carrier and a dispersion of microcapsules therein, the microcapsules each comprising:
   a. a plurality of particles, at least some of the particles contrasting visually and being differentially responsive to an electric field such that, depending on the direction of the field, the at least some of the particles assume a first or a second visually differentiable appearance in accordance with a bistability characteristic and a threshold characteristic; and
   b. means for enhancing at least one of the characteristics.

14. The material of claim 13 wherein the enhancing means comprising a liquid crystal material contained in the microcapsules.

15. The material of claim 13 wherein:
   a. the plurality of particles is dispersed in a carrier liquid;
   b. the particles each have a permanent charge;
   c. the microcapsules comprise interior surfaces; and
   d. the enhancing means comprises bound charges associated with the interior surfaces of the microcapsules, the bound charges being opposite in sign to the charges of the particles.

16. The material of claim 15 wherein the bound charges comprise at least one charge-control additive associated with the interior surfaces.

17. The material of claim 13 wherein the plurality of particles comprises a first quantity of particles having a first optical property and a second quantity of particles having a second optical property, the first and second quantity of particles exhibiting different triboelectric properties.

18. The material of claim 13 wherein the microcapsules have interior surfaces, the at least some of the plurality of particles and the interior surfaces exhibiting different triboelectric properties.

19. The material of claim 13 wherein the particles comprise at least one charging agent selected from the group consisting of of (a) adsorbed charging agents, (b) copolymerized charging agents, and (c) embedded charging agents.

20. The material of claim 19 wherein the charging agent is an emitter.

21. The material of claim 13 wherein the at least some of the plurality of particles comprise particles of a semiconductor or varistor material.

22. The material of claim 13 further comprising a liquid having a charge-control agent dissolved therein.

23. A printed electronic display comprising the material of claim 1.

24. A printed electronic display comprising the material of claim 13.

25. The material of claim 13 wherein the microcapsules further comprise a carrier liquid that is substantially transparent, a first quantity of the particles having a first optical property and a first charge and a second quantity of the particles having a second optical property and a second charge different from the first charge, the first and second optical properties differing visually.

26. An electrophoretic or dielectrophoretic material comprising a carrier and a dispersion of microcapsules therein, the microcapsules each comprising:
   a. a dyed fluid;
   b. a plurality of particles, at least some of the particles contrasting visually and being differentially responsive to an electric field such that, depending on the direction of the field, at least some of the particles assume a first or a second visually differentiable appearance in accordance with a bistability characteristic and a threshold characteristic; and
   c. means for enhancing at least one of the characteristics.

27. The material of claim 26 wherein the enhancing means comprises a liquid crystal material contained in the microcapsules.

28. The material of claim 26 wherein:
   a. the plurality of particles is dispersed in a carrier liquid;
   b. the particles each have a permanent charge;
   c. the microcapsules comprise interior surfaces; and
   d. the enhancing means comprises bound charges associated with the interior surfaces of the microcapsules, the bound charges being opposite in sign to the charges of the particles.

29. The material of claim 28 wherein the bound charges comprise at least one charge-control additive associated with the interior surfaces.

30. The material of claim 26 wherein the plurality of particles comprises a first quantity of particles having a first optical property and a second quantity of particles having a second optical property, the first and second quantity of particles exhibiting different triboelectric properties.

31. The material of claim 26 wherein the microcapsules have interior surfaces, the at least some of the plurality of particles and the interior surfaces exhibiting different triboelectric properties.

32. The material of claim 26 wherein the particles comprise at least one charging agent selected form the group consisting of (a) adsorbed charging agents, (b) copolymerized charging agents, and (c) embedded charging agents.

33. The material of claim 32 wherein the charging agent is an emitter.

34. The material of claim 26 wherein at least some of the plurality of particles comprise particles of a semiconductor or varistor material.

35. The material of claim 26 further comprising a liquid having a charge-control agent dissolved therein.

36. An electrophoretic or dielectrophoretic material comprising a carrier and a dispersion of microcapsules therein, the microcapsules each comprising:
   a. a plurality of particles, at least some of the particles having a first electrophoretic mobility and at least some of the particles having a second electrophoretic mobility; and
   b. means for enhancing the reflectivity of at least some of the particles.

37. The material of claim 36 wherein the means for enhancing reflectivity of at least some of the particles comprises a reflective material associated with the at least some of the particles.

38. The material of claim 37 wherein the reflective material is a metal shell coated over the particles.

39. The material of claim 38 wherein the metal is selected from the group consisting of aluminum, silver and gold.

40. The material of claim 37 wherein the reflective material comprises metal flakes embedded within the particles.

41. The material of claim 37 wherein the reflective material is a quantity of glass retroreflector spheres embedded within the particles.

42. The material of claim 37 wherein the reflective material is an outer clear capsule surrounding each particle.

43. The material of claim 36 wherein the means for enhancing reflectivity comprises a reflective material dispersed in the liquid phase.

44. The material of claim 43 wherein the reflective material comprises clear particles.

45. The material of claim 44 wherein the liquid phase and the clear particles have refractive indices, the refractive index of the particles exceeding the refractive index of the liquid phase.

* * * * *